United States Patent
Oda et al.

(10) Patent No.: US 9,739,289 B2
(45) Date of Patent: Aug. 22, 2017

(54) TURBO-COMPRESSOR

(71) Applicant: DAIKIN INDUSTRIES, LTD., Osaka-Shi (JP)

(72) Inventors: Kentarou Oda, Tokyo (JP); Seiichiro Yoshinaga, Tokyo (JP); Nobuyoshi Sakuma, Tokyo (JP)

(73) Assignee: DAIKIN INDUSTRIES, LTD., Osaka-shi (JP)

( * ) Notice: Subject to any disclaimer, the term of this patent is extended or adjusted under 35 U.S.C. 154(b) by 551 days.

(21) Appl. No.: 14/149,426

(22) Filed: Jan. 7, 2014

(65) Prior Publication Data
US 2014/0119890 A1 May 1, 2014

Related U.S. Application Data

(63) Continuation of application No. PCT/JP2012/067335, filed on Jul. 6, 2012.

(30) Foreign Application Priority Data

Jul. 13, 2011 (JP) ................................. 2011-154644

(51) Int. Cl.
*F04D 29/46* (2006.01)
*F04D 29/66* (2006.01)
(Continued)

(52) U.S. Cl.
CPC ......... *F04D 29/668* (2013.01); *F01D 17/162* (2013.01); *F04D 17/10* (2013.01);
(Continued)

(58) Field of Classification Search
CPC .... F04D 27/0246; F04D 29/46; F04D 29/464; F04D 29/462
(Continued)

(56) References Cited

U.S. PATENT DOCUMENTS 3,362,625 A 1/1968 Endress
3,632,224 A 1/1972 Wright et al.
(Continued)

FOREIGN PATENT DOCUMENTS

JP 02-287577 11/1990
JP 04-145230 5/1992
(Continued)

OTHER PUBLICATIONS

Combined Office Action and Search Report issued Jul. 31, 2015 in Chinese Patent Application No. 201280032916.4 with English translation of category of cited documents.
(Continued)

*Primary Examiner* — Justin Seabe
(74) *Attorney, Agent, or Firm* — Oblon, McClelland, Maier & Neustadt, L.L.P.

(57) ABSTRACT

A turbo-compressor including a variable vane that adjusts the flow rate of a fluid, a drive shaft that is connected to the variable vane and is rotated to drive the variable vane, a motor that rotationally drives the drive shaft, and a coupling that couples the drive shaft with an output shaft of the motor. Between the drive shaft and output shaft and the coupling, a vibration isolation means is arranged to connect the drive shaft and output shaft to each other so that they rotate together and allow the drive shaft and output shaft to move in a vibration direction.

6 Claims, 4 Drawing Sheets

(51) Int. Cl.
*F04D 17/10* (2006.01)
*F04D 29/42* (2006.01)
*F01D 17/16* (2006.01)
*F16D 3/04* (2006.01)

(52) U.S. Cl.
CPC ....... *F04D 29/4213* (2013.01); *F04D 29/462* (2013.01); *F16D 3/04* (2013.01); *F05D 2250/51* (2013.01); *F16D 2300/22* (2013.01)

(58) Field of Classification Search
USPC .......................................................... 464/104
See application file for complete search history.

(56) References Cited

U.S. PATENT DOCUMENTS

| | | | | |
|---|---|---|---|---|
| 4,332,148 | A * | 6/1982 | Maki | .......................... F16D 3/04 464/102 |
| 4,836,746 | A | 6/1989 | Owsianny et al. | |
| 6,129,511 | A | 10/2000 | Salvage et al. | |
| 6,398,483 | B1 | 6/2002 | Conete et al. | |
| 6,517,439 | B1 * | 2/2003 | Sears | ....................... F16D 3/265 464/104 |
| 2007/0172348 | A1 * | 7/2007 | Battig | ................... F01D 17/165 415/160 |
| 2007/0231125 | A1 | 10/2007 | Oeschger et al. | |
| 2008/0050220 | A1 | 2/2008 | Merry et al. | |
| 2008/0119294 | A1 * | 5/2008 | Erikson | ..................... F16D 3/04 464/104 |
| 2009/0208329 | A1 | 8/2009 | Bertino | |
| 2011/0219813 | A1 * | 9/2011 | Kurihara | ............ F04D 25/0606 62/498 |

FOREIGN PATENT DOCUMENTS

| | | | |
|---|---|---|---|
| JP | 2844067 | 1/1999 | |
| JP | 2009-185716 | 8/2009 | |
| JP | 2009-531581 | 9/2009 | |
| JP | 2009-540210 | 11/2009 | |
| WO | WO 2007/112601 A1 | 10/2007 | |
| WO | WO 2007/144430 A1 | 12/2007 | |
| WO | WO 2011/011338 A1 | 1/2011 | |
| WO | WO 2011011338 A1 * | 1/2011 | ........... F01D 17/162 |

OTHER PUBLICATIONS

Extended European Search Report issued Apr. 22, 2015 in Patent Application No. 12810539.2.
International Search Report in PCT/JP2012/067335 mailed Oct. 9, 2012.

* cited by examiner

TURBO-COMPRESSOR

CROSS REFERENCE TO RELATED APPLICATION

This application is a Continuation of PCT Application No. PCT/JP2012/067335, filed on Jul. 6, 2012 and claims the benefit of priority under 35 U.S.C. 119(a) to Japanese Patent Application No. 2011-154644 filed on Jul. 13, 2011 whose disclosed contents are cited herein.

TECHNICAL FIELD

The present invention relates to a turbo-compressor capable of compressing a fluid with a plurality of impellers.

BACKGROUND ART

A conventional turbo-compressor applied to a turbo-refrigerating machine or the like includes an inlet guide vane that is a variable vane arranged at, for example, an inlet port to draw a fluid compressed by an impeller and adjust the flow rate of the fluid, a drive shaft that is connected to the inlet guide vane and is rotated to drive the inlet guide vane, a motor for driving the drive shaft, and a coupling for coupling the drive shaft with an output shaft of the motor. A related art is disclosed in, for example, Japanese Unexamined Patent Application Publication No. 2009-185716.

In such a turbo-compressor, the coupling consists of, for example, halved members that hold the drive shaft and the output shaft of the motor and are fixed together with a fall-off preventive bolt to completely fix the drive shaft and the output shaft of the motor together so that an axial center position of the drive shaft agrees with that of the output shaft of the motor and so that the torque of the motor is transmitted to the drive shaft.

SUMMARY OF INVENTION

Problems to be Solved by Invention

The above-mentioned turbo-compressor, however, completely fixes the drive shaft and the output shaft of the motor with the coupling, and therefore, vibration transmitted from the variable vane to the drive shaft when drawing a fluid is directly transmitted to the output shaft of the motor.

The vibration transmitted to the output shaft of the motor sometimes exceeds an allowable vibration value of the motor. Namely, there is a risk that the vibration from the variable vane badly affects the motor.

According to the present invention, a turbo-compressor capable of suppressing vibration to be transmitted to the motor can be provided.

Means to Solve Problems

According to a technical aspect of the present invention, there is provided a turbo-compressor including a variable vane that adjusts the flow rate of a fluid, a drive shaft that is connected to the variable vane and is rotated to drive the variable vane, a motor that rotationally drives the drive shaft, and a coupling that couples the drive shaft with an output shaft of the motor. The turbo-compressor is characterized in that a vibration isolation means is arranged between the drive shaft and output shaft and the coupling, to connect the drive shaft and output shaft to each other so that they rotate together and allow the drive shaft and output shaft to move in a vibration direction.

MODE OF IMPLEMENTING INVENTION

A turbo-refrigerating machine employing a turbo-compressor according to an embodiment of the present invention will be explained with reference to FIG. 1.

Figure 1:
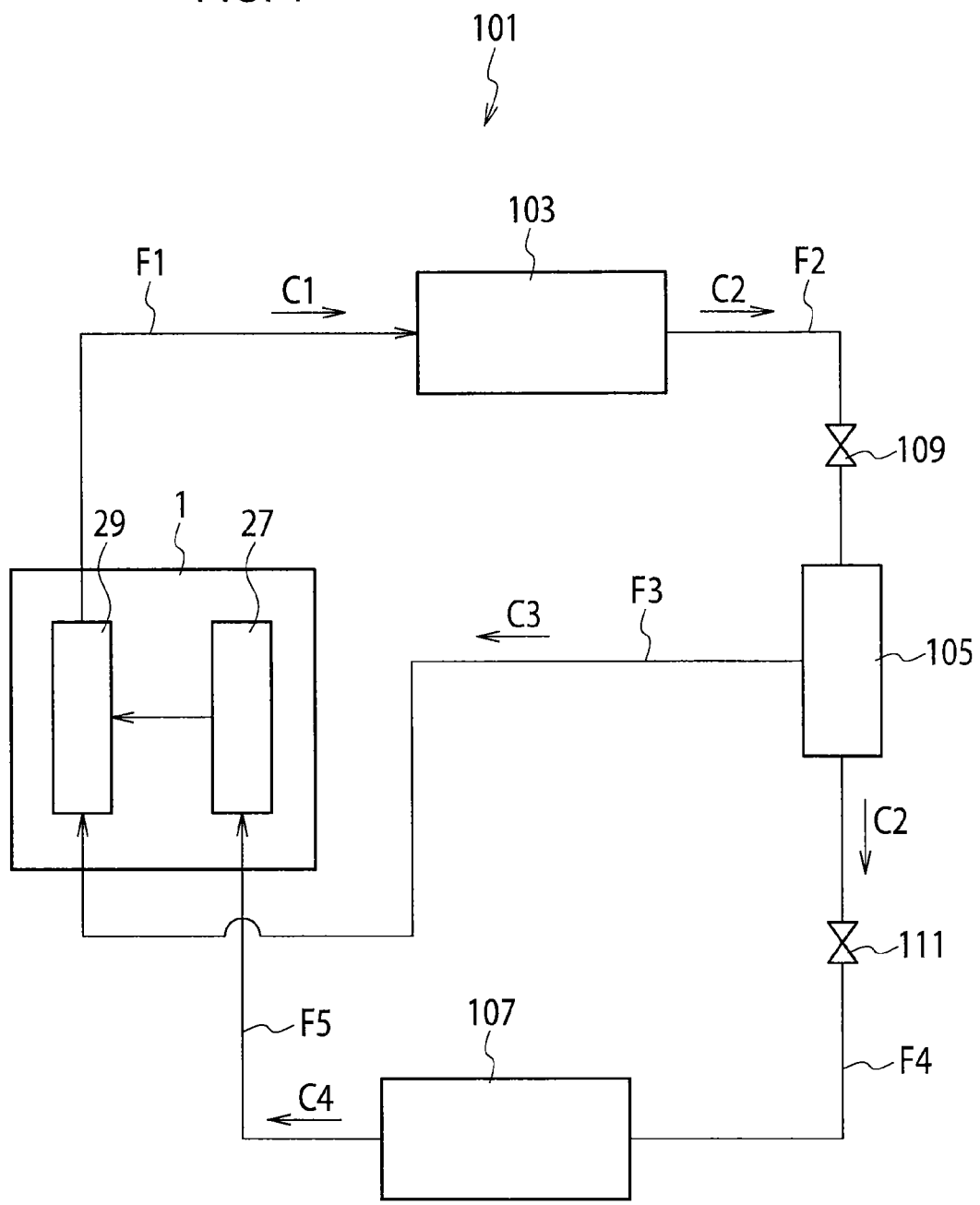
FIG. 1 is a schematic view illustrating a turbo-refrigerating machine having a turbo-compressor according to an embodiment of the present invention.

As illustrated in FIG. 1, the turbo-refrigerating machine 101 is an apparatus for producing cooling water for air conditioning and includes a condenser 103, an economizer 105, an evaporator 107, and the turbo-compressor 1.

The condenser 103 is connected through a flow path F1 to the turbo-compressor 1 and is also connected through a flow path F2 to the economizer 105 where an expansion valve 109 for decompression is arranged in the economizer 105. To the condenser 103, the turbo compressor 1 supplies through the flow path F1 a compressed coolant gas C1 compressed in a gaseous state. The condenser 103 is a mechanism configured to cool and liquidize the compressed coolant gas C1 into a coolant liquid C2. The coolant liquid C2 cooled and liquidized by the condenser 103 passes through the flow path F2 and is decompressed by the expansion valve 109 for supplying to the economizer 105.

The economizer 105 is connected through a flow path F3 to the turbo-compressor 1 and is also connected through a flow path F4 to the evaporator 107. An expansion valve 111 for decompression is arranged in the evaporator 107. The economizer 105 is a mechanism to temporarily store the coolant liquid C2 supplied from the condenser 103 and decompressed through the flow path F2. A gaseous component C3 of the coolant liquid C2 stored in the economizer 105 is supplied through the flow path F3 to a second compression stage 29 of the turbo-compressor 1. The coolant liquid C2 stored in the economizer 105 passes through the flow path F4 and is decompressed by the expansion valve 111 for supplying to the evaporator 107.

The evaporator 107 is connected through a flow path F5 to a first compression stage 27 of the turbo-compressor 1. The evaporator 107 is a mechanism configured to evaporate the coolant liquid C2 supplied from the economizer 105 and decompressed through the flow path F4 into a coolant gas C4. The coolant gas C4 evaporated by the evaporator 107 is supplied through the flow path F5 to the first compression stage 27 of the turbo-compressor 1.

The turbo-compressor 1 has the first compression stage 27 and second compression stage 29 and is connected through the flow path F1 to the condenser 103. The turbo-compressor 1 is a mechanism that compresses the coolant gas C4 supplied through the flow path F5 to the first compression stage 27, discharges the compressed coolant gas to the second compression stage 29, and compresses, in the second compression stage 29, the gaseous component C3 supplied through the flow path F3 and the coolant gas C4 discharged from the first compression stage 27 into the compressed coolant gas C1. The compressed coolant gas C1 compressed by the turbo-compressor 1 is supplied through the flow path F1 to the condenser 103.

With reference to FIGS. 2-3, 4A, and 4B the turbo-compressor according to the embodiment of the present invention will be explained.

The turbo-compressor 1 according to the present embodiment has a variable vane 3 that is driven to adjust the flow rate of a fluid, a drive shaft 5 that is connected to the variable vane 3 and is rotated to drive the variable vane 3, a motor 7 that drives and rotates the drive shaft 5, and a coupling 11 that connects the drive shaft 5 and an output shaft 9 of the motor 7 to each other.

Between the drive shaft 5 and output shaft 9 and the coupling 11, there is arranged a vibration isolation means 13 that connects the drive shaft 5 and output shaft 9 to each other so that they rotate together and allows the drive shaft 5 and output shaft 9 to move in a vibration direction.

The vibration isolation means 13 is arranged on each of opposing faces of the coupling 11, drive shaft 5, and output shaft 9. More precisely, the vibration isolation means 13 includes a groove 15 formed on the drive shaft side and a groove 17 formed on the motor side, which are two grooves intersecting each other on a plane that is orthogonal to an axial direction of the drive shaft 5, and a drive-shaft-side projection 19 and a motor-side projection 21, which are two projections engaging with the drive-shaft-side groove 15 and motor-side groove 17, respectively.

The drive-shaft-side groove 15 (motor-side groove 17) and drive-shaft-side projection 19 (motor-side projection 21) each has an engagement part provided with engagement faces (side faces) that are substantially parallel to the drive shaft 5. A virtual plane defining the engagement faces of the drive-shaft-side groove 15 and a virtual plane defining the engagement faces of the motor-side groove 17 have an intersecting positional relationship and are typically orthogonal to each other.

A front end face of each of the drive-shaft-side projection 19 and motor-side projection 21 is defined by a virtual plane that is orthogonal to the drive shaft 5. Similarly, a bottom face of each of the drive-shaft-side groove 15 and motor-side groove 17 is defined by a virtual plane that is orthogonal to the drive shaft 5. Each end of the drive-shaft-side projection 19 and motor-side projection engages with corresponding one of the drive-shaft-side groove 15 and motor-side groove 17 and is formed by the virtual plane defining the bottom face and curved faces continuous to the virtual plane.

Figure 2:
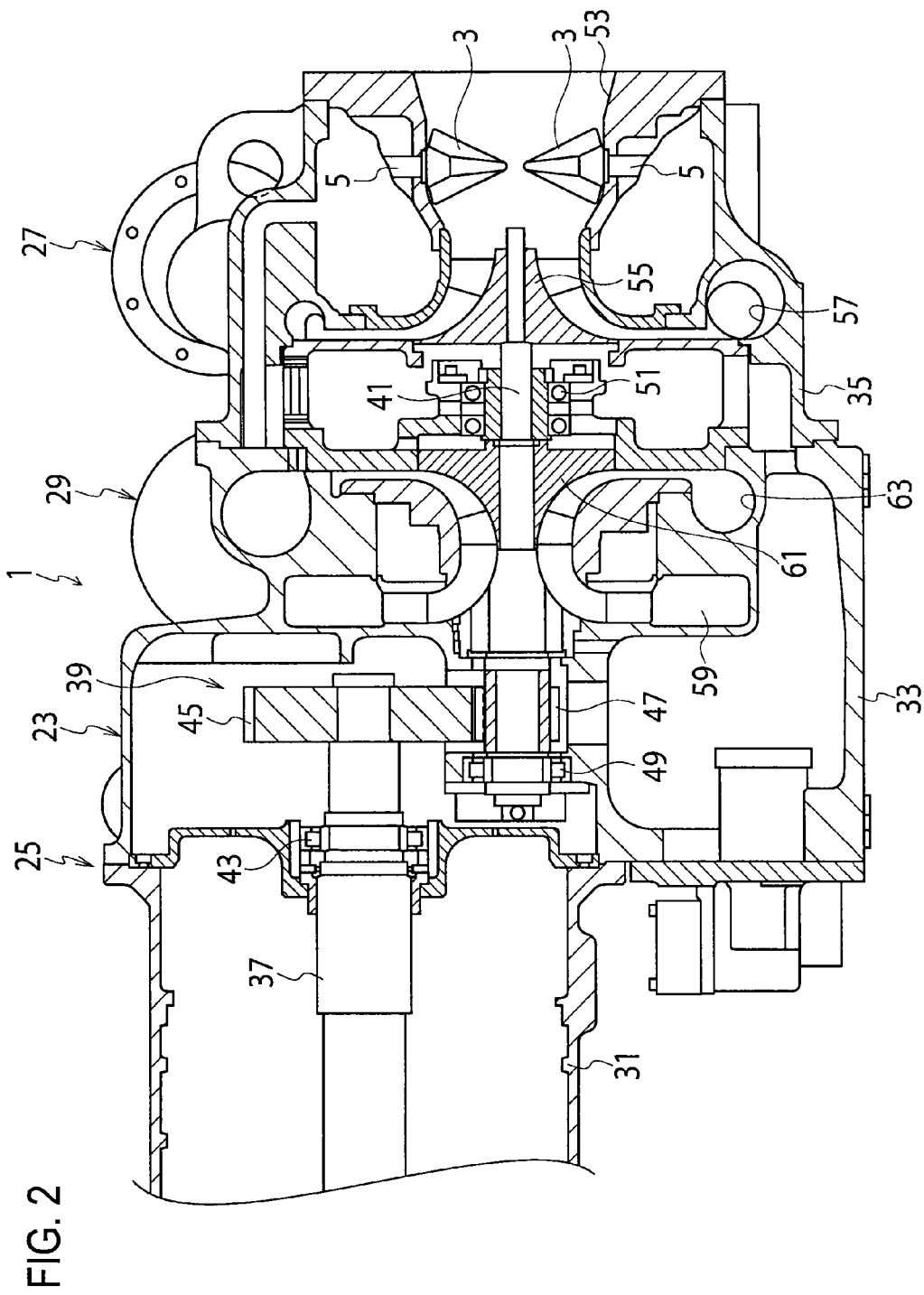
FIG. 2 is a sectional view illustrating the turbo-compressor according to the embodiment of the present invention.

As illustrated in FIG. 2, the turbo-compressor 1 includes a housing 23, a gear unit 25, the first compression stage 27, and the second compression stage 29.

The housing 23 consists of divided housings including a motor housing 31, a gear housing 33, and a compressor housing 35. These housings are fixed into one with fixing units such as bolts. The housing 23 accommodates the gear unit 25, first compression stage 27, and second compression stage 29.

The gear unit 25 has a motor shaft 37, a speed change gear set 39, and a rotary shaft 41. The motor shaft 37 is an output shaft of a drive source motor (not illustrated) and is rotatably supported by the motor housing 31 through a bearing 43. Rotation of the motor shaft 37 is transmitted to the speed change gear set 39.

The speed change gear set 39 includes a large-diameter gear 45 and a small-diameter gear 47. The large-diameter gear 45 is fixed to an end of the motor shaft 37 to rotate together with the motor shaft 37. The small-diameter gear 47 meshes with the large-diameter gear 45 to speed up the rotation of the motor shaft 37. The small-diameter gear 47 is fixed to an end of the rotary shaft 41 to rotate together with the rotary shaft 41.

The rotary shaft 41 is rotatably supported at axial ends thereof by the gear housing 33 and compressor housing 35 through bearings 49 and 51. Rotation of the rotary shaft 41 drives the first compression stage 27 and second compression stage 29.

The first compression stage 27 has an inlet port 53, a first impeller 55, and a first scroll chamber 57. The inlet port 53 is arranged in the compressor housing 35 and is connected to the flow path F5 (refer to FIG. 1). The inlet port 53 draws the coolant gas C4 evaporated by the evaporator 107 (refer to FIG. 1) and supplies the same to the first impeller 55.

The first impeller 55 is fixed to an outer circumference of the rotary shaft 41 to rotate together with the same. When the rotary shaft 41 rotates, the first impeller 55 discharges the coolant gas C4, which has been supplied in an axial direction from the inlet port 53, in a diametral direction and compresses the coolant gas C4. The compressed coolant gas C4 is supplied to the first scroll chamber 57.

The first scroll chamber 57 is arranged in the compressor housing 35 and is connected to external piping (not illustrated) arranged outside the housing 23. Through the external piping, the first scroll chamber 57 supplies the coolant gas C4 compressed by the first impeller 55 to the second compression stage 29.

The second compression stage 29 has an introduction scroll chamber 59, a second impeller 61, and a second scroll chamber 63. The introduction scroll chamber 59 is arranged in the gear housing 33 and is connected through the external piping to the first scroll chamber 57. The introduction scroll chamber 59 supplies the coolant gas C4 compressed by the first compression stage 27 to the second impeller 61.

The second impeller 61 is arranged on the outer circumference of the rotary shaft 41 in a back-to-back state with respect to the first impeller 55 with a bearing 51 axially interposed between them. The second impeller 51 is fixed to the rotary shaft 41 to rotate together with the same. When the rotary shaft 41 is rotated, the second impeller 61 diametrally discharges the compressed coolant gas C4 axially supplied from the introduction scroll chamber 59 and the gaseous component C3 supplied through the flow path F3 (refer to FIG. 1), to further compress the compressed coolant gas C4 and gaseous component C3 into the compressed coolant gas C1. The compressed coolant gas C1 is supplied to the second scroll chamber 63.

The second scroll chamber 63 is arranged in the gear housing 33 and is connected to the flow path F1 as illustrated in FIG. 1. The second scroll chamber 63 supplies the compressed coolant gas C1 compressed by the second impeller 61 to the condenser 103 through the flow path F1.

The turbo-compressor 1 is constituted in this way. When the motor shaft 37 is driven to rotate, the rotary shaft 41 is rotated through the speed change gear set 39. The rotation of the rotary shaft 41 drives the first compression stage 27 and second compression stage 29.

When the first compression stage 27 is driven, the coolant gas C4 passed through the flow path F5 is supplied through the inlet port 53 to the first impeller 55. The coolant gas C4 supplied to the first impeller 55 is compressed by the rotation of the first impeller 55 and is supplied through the first scroll chamber 57 to the second compression stage 29. To the second compression stage 29, the gaseous component C3 is also supplied from the economizer 105 through the flow path F3 as illustrated in FIG. 1.

The coolant gas C4 from the first compression stage 27 and the gaseous component C3 that are supplied to the second compression stage 29 are supplied to the second impeller 61. The coolant gas C4 and gaseous component C3 supplied to the second impeller 61 are compressed by the rotation of the second impeller 61 into the compressed coolant gas C1, which is supplied from the second scroll chamber 63 to the flow path F1 to the condenser 103.

At the inlet port 53 of the first compression stage 27 of the turbo-compressor 1 mentioned above, a plurality of the variable vanes 3 are arranged to adjust the intake flow rate of the coolant gas C4, i.e., fluid. When driven, the plurality of variable vanes 3 change an apparent area in a flowing direction of the coolant gas C4, thereby adjusting the flow rate of the coolant gas C4 to be drawn into the first compression stage 27. Each variable vane 3 is driven by the motor 7 through the drive shaft 5 and coupling 11.

Figure 3:
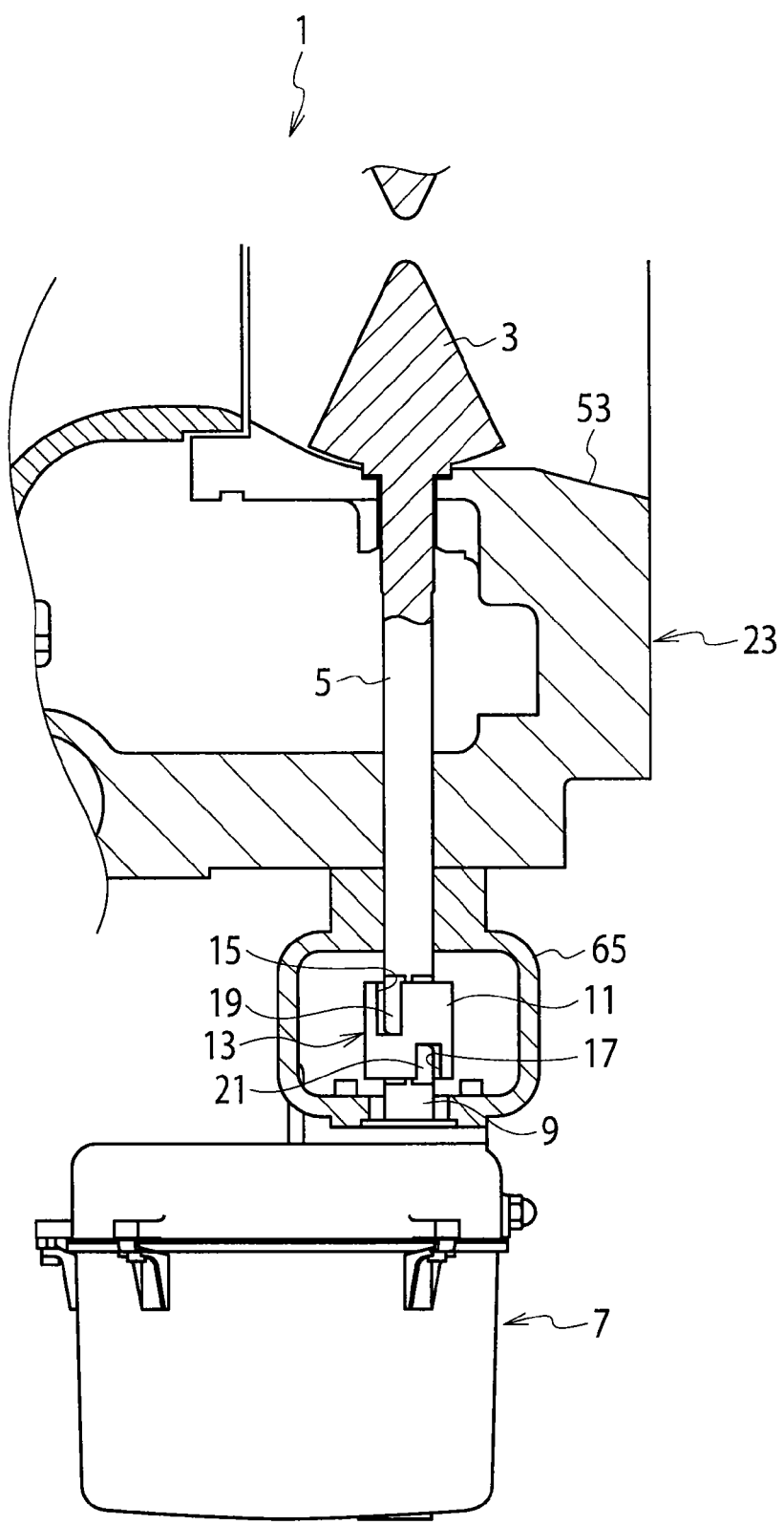
FIG. 3 is an enlarged view illustrating essential part of the turbo-compressor according to the embodiment of the present invention.

As illustrated in FIG. 3, the drive shaft 5 is rotatably supported with the housing 23. An axial first end of the drive shaft 5 is integrally fixed to the variable vane 3 and an axial second end thereof is arranged in a casing 65 that is arranged outside the housing 23. The drive shaft 5 is rotated due to torque of the motor 7, to drive the variable vane 3.

The motor 7 is arranged outside the housing 23 and the output shaft 9 thereof is arranged in the casing 65. Inside the casing 65, the output shaft 9 of the motor 7 is connected through the coupling 11 to the drive shaft 5.

The coupling 11 has a cylindrical shape and couples an end of the drive shaft 5 with an end of the output shaft 9 of the motor 7 in a rotation direction, thereby connecting the drive shaft 5 and output shaft 9 to each other so that they rotate together. The coupling 11 and the drive shaft 5 and output shaft 9 are provided with the vibration isolation means to prevent vibration from being transmitted between the drive shaft 5 and the output shaft 9.

Figure 4A:
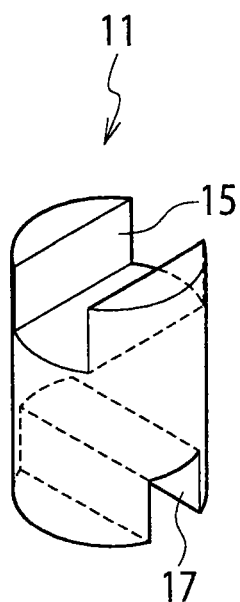
FIG. 4A is a perspective view illustrating a coupling of the turbo-compressor according to the embodiment of the present invention and FIG. 4B is an enlarged side view illustrating a drive shaft, an output shaft, and the coupling of the turbo-compressor according to the embodiment of the present invention.
Figure 4B:
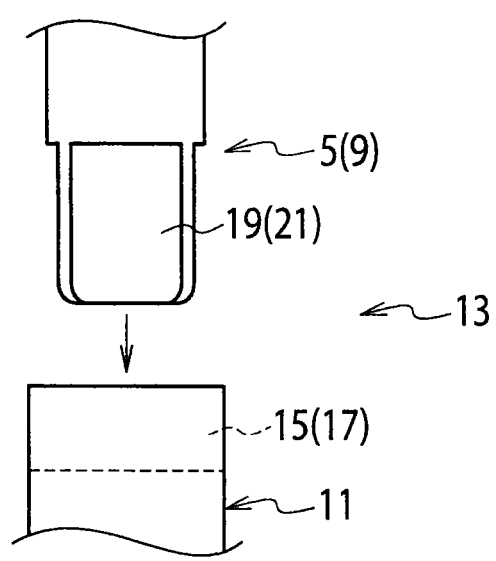

As illustrated in FIGS. 3, 4A and 4B, the vibration isolation means 13 includes the drive-shaft-side groove 15 and motor-side groove 17 formed on the coupling 11 and the drive-shaft-side projection 19 and motor-side projection 21 formed on the drive shaft 5 and output shaft 9, respectively.

The drive-shaft-side groove 15 and motor-side groove 17 are formed in the faces of the coupling 11 that oppose the drive shaft 5 and the output shaft 9 of the motor 7, respectively. The drive-shaft-side groove 15 and motor-side groove 17 orthogonally intersect each other on a plane orthogonal to the axial direction of the drive shaft 5 and output shaft 9. The drive-shaft-side groove 15 and motor-side groove 17 engage with the drive-shaft-side projection 19 and motor-side projection 21, respectively.

The drive-shaft-side projection 19 and motor-side projection 21 protrude from an end of the drive shaft 5 and an end of the output shaft 9 of the motor 7, respectively, toward the coupling 11. Faces of the drive-shaft-side projection 19 and motor-side projection 21 that oppose the drive-shaft-side groove 15 and motor-side groove 17 are each curved.

When the drive-shaft-side projection 19 and motor-side projection 21 are engaged with the drove-shaft-side groove 15 and motor-side groove 17, opposing faces thereof come into contact with each other in a rotation direction around the axial center of the drive shaft 5 and output shaft 9, thereby transmitting torque of the motor 7 to the drive shaft 5.

In a vibration direction (radial direction) other than the rotation direction around the axial center of the drive shaft 5 and output shaft 9, the drive-shaft-side projection 19 and motor-side projection 21 are allowed to move in the drive-shaft-side groove 15 and motor-side groove 17. As a result, vibrations generated by the drive shaft 5 and output shaft 9 are not transmitted between the drive shaft 5 and the output shaft 9. Since the virtual planes that define the engaging faces (side faces) of the drive-shaft-side projection 19 and motor-side projection 21 intersect (orthogonally) each other, vibration in any radial direction can be absorbed by the vibration isolation means 13.

With such a vibration isolation means 13, the drive shaft 5 and the output shaft 9 of the motor 7 are connected to each other in a rotation direction and vibrations are prevented from being transmitted between the drive shaft 5 and the output shaft 9. Even if the variable vanes 3 are vibrated by fluid, the vibration will not be transmitted to the motor 7, thereby protecting the motor 7.

In the turbo-compressor 1 mentioned above, the vibration isolation means 13 is arranged between the drive shaft 5 and output shaft 9 and the coupling 11, to connect the drive shaft and output shaft 9 to each other so that they rotate together and allow the drive shaft 5 and output shaft 9 to move in a vibration direction. This configuration transmits torque of the motor 7 to the drive shaft 5 and prevents vibration from being transmitted between the drive shaft 5 and the output shaft 9.

Accordingly, the turbo-compressor 1 with the vibration isolation means 13 is capable of suppressing the transmission of vibration to the motor 7 and minimizing the influence of vibration on the motor 7.

The vibration isolation means 13 includes the drive-shaft-side groove 15 and motor-side groove 17 that intersect each other on a plane orthogonal to the axial direction of the drive shaft 5 and the drove-shaft-side projection 19 and motor-side projection 21 that engage with the drive-shaft-side groove 15 and motor-side groove 17, respectively. This configuration allows the drive shaft 5 and output shaft 9 to move in directions other than the rotation direction and prevents vibration from being transmitted between the drive shaft 5 and the output shaft 9.

The ends of the drive-shaft-side projection 19 and motor-side projection 21 that engage with the drive-shaft-side groove 15 and motor-side groove 17 are formed of curved faces so that the drive-shaft-side projection 19 and motor-side projection 21 are movable in the rotation direction along the inner faces of the drive-shaft-side groove 15 and motor-side groove 17. This configuration expands the movable ranges of the drive shaft 5 and output shaft 9 and prevents vibration from being transmitted between the drive shaft 5 and the output shaft 9.

In the turbo-compressor according to the embodiment of the present invention, the variable vanes are arranged at the inlet port of the first compression stage. The variable vanes are arrangeable at any location where the flow rate of a fluid is adjustable, such as on an inlet side of the second compression stage or in the middle of a flow path.

Instead of arranging the two grooves on the coupling and the two projections on the drive shaft and output shaft, the two grooves may be arranged on the drive shaft and output shaft and the two projections on the coupling. Alternatively, the two grooves may be arranged on the drive shaft and coupling and the two projections on the coupling and output shaft. In this way, the two grooves and two projections may be arranged in various ways on the faces of the coupling and the drive shaft and output shaft that face each other.

Although the variable vane and drive shaft are fixed to each other so that they rotate together, it is possible, for example, to arrange a link mechanism between the variable vane and the drive shaft so that rotation of the drive shaft is transmitted through the link mechanism to the variable vane. In this case, vibration is transmitted from the variable vane to the drive shaft through the link mechanism. However, the vibration isolation means prevents the vibration from being transmitted to the motor.

The present invention has an effect of providing a turbo-compressor capable of suppressing vibration to be transmitted to a motor.

The invention claimed is:

1. A turbo-compressor, comprising:
 a variable vane that adjusts the flow rate of a fluid;
 a drive shaft connected to the variable vane and rotated to drive the variable vane;
 a motor that drives the drive shaft;
 a coupling that couples the drive shaft with an output shaft of the motor; and
 a vibration isolation means between the drive shaft and the output shaft that connects the drive shaft and output shaft to each other so that they rotate together and allows the drive shaft and output shaft to move in a radial vibration direction with respect to the drive shaft, wherein
 the vibration isolation means includes a first projection arranged on the drive shaft, a second projection arranged on the output shaft, and two grooves arranged on opposing faces of the coupling, and
 the first projection and the second projection each engage with one of the two grooves and are movable in a rotation direction along respective inner faces of the two grooves.

2. The turbo-compressor according to claim 1, wherein the two grooves intersect each other on a plane orthogonal to an axial direction of the drive shaft.

3. The turbo-compressor according to claim 2, wherein an end of at least one of the first projection and the second projection is formed as a curved face.

4. The turbo-compressor according to claim 2, wherein each groove of the two grooves and an associated projection of the first projection and the second projection each has an engagement part provided with engagement side faces that are substantially parallel to each other so that the respective first and second projection is allowed to move along the respective engagement side faces.

5. A turbo-compressor, comprising:
 a variable vane that adjusts the flow rate of a fluid;
 a drive shaft connected to the variable vane and rotated to drive the variable vane, the drive shaft including a first projection on an end of the drive shaft;
 a motor that drives the drive shaft, the motor including an output shaft and an end of the output shaft includes a second projection; and
 a coupling that couples the drive shaft with the output shaft, the coupling including a first groove on a first face of the coupling and a second groove on a second face of the coupling that opposes the first face, wherein
 the first projection engages with the first groove and the second projection engages with the second groove to connect the drive shaft and output shaft to each other so that they rotate together and allows the drive shaft and output shaft to move in a radial vibration direction with respect to the drive shaft, and
 the first projection is movable in a rotation direction along an inner face of the first groove and the second projection is movable in the rotation direction along an inner face of the second groove.

6. The turbo-compressor according to claim 5, wherein:
 a respective side face of the first groove and the second groove extend in an axial direction of the coupling, and
 planes of the respective side faces orthogonally intersect.

* * * * *